United States Patent [19]

Schneider

[11] Patent Number: 4,701,203
[45] Date of Patent: Oct. 20, 1987

[54] COOLING ARRANGEMENT FOR A GLASS FORMING APPARATUS

[75] Inventor: Wilhelm Schneider, Auetal, Fed. Rep. of Germany

[73] Assignee: Hermann Heye, Obernkirchen, Fed. Rep. of Germany

[21] Appl. No.: 841,597

[22] Filed: Mar. 20, 1986

Related U.S. Application Data

[63] Continuation of Ser. No. 599,561, Apr. 11, 1984, abandoned.

[30] Foreign Application Priority Data

Apr. 16, 1983 [DE] Fed. Rep. of Germany ....... 3313934

[51] Int. Cl.$^4$ .......................... C03B 9/14; C03B 9/16; C03B 9/38; C03B 11/12
[52] U.S. Cl. ....................... 65/265; 65/267; 65/355; 65/356; 137/580
[58] Field of Search ................ 65/162, 265, 267, 319, 65/355, 356; 425/526, 552; 137/580; 241/301

[56] References Cited

U.S. PATENT DOCUMENTS

| 3,895,931 | 7/1975 | Hamilton ............................ 65/207 |
| 4,361,434 | 11/1982 | Schneider ........................... 65/265 |
| 4,388,099 | 6/1983 | Hermening et al. ................. 65/267 |

FOREIGN PATENT DOCUMENTS 102820  3/1984  European Pat. Off. ............. 65/265

Primary Examiner—S. Leon Bashore
Assistant Examiner—Michael K. Boyer
Attorney, Agent, or Firm—Michael J. Striker

[57] ABSTRACT

A cooling arrangement for a forming tool of a machine for forming molten glass or other thermoplastic materials, wherein the forming tool is coolable by a pressure fluid and turnable about a first pivoting axle, includes at least one stationary supply conduit having an outlet opening, a pressure distributing device for the forming tool turnable relative to said supply conduit about the first pivoting axle, and a connecting conduit arranged to connect each supply conduit with the pressure fluid distributing device and having an articulated conduit component turnable about a second pivoting axle which is fixed relative to the pressure fluid distributing device and is parallel to the first pivoting axle, the articulated conduit component having an inlet opening which is in a constant communication with the outlet opening of the supply conduit, the articulated conduit component being displaceable relative to the supply conduit in a displacement plane normal to the pivoting axles.

14 Claims, 12 Drawing Figures

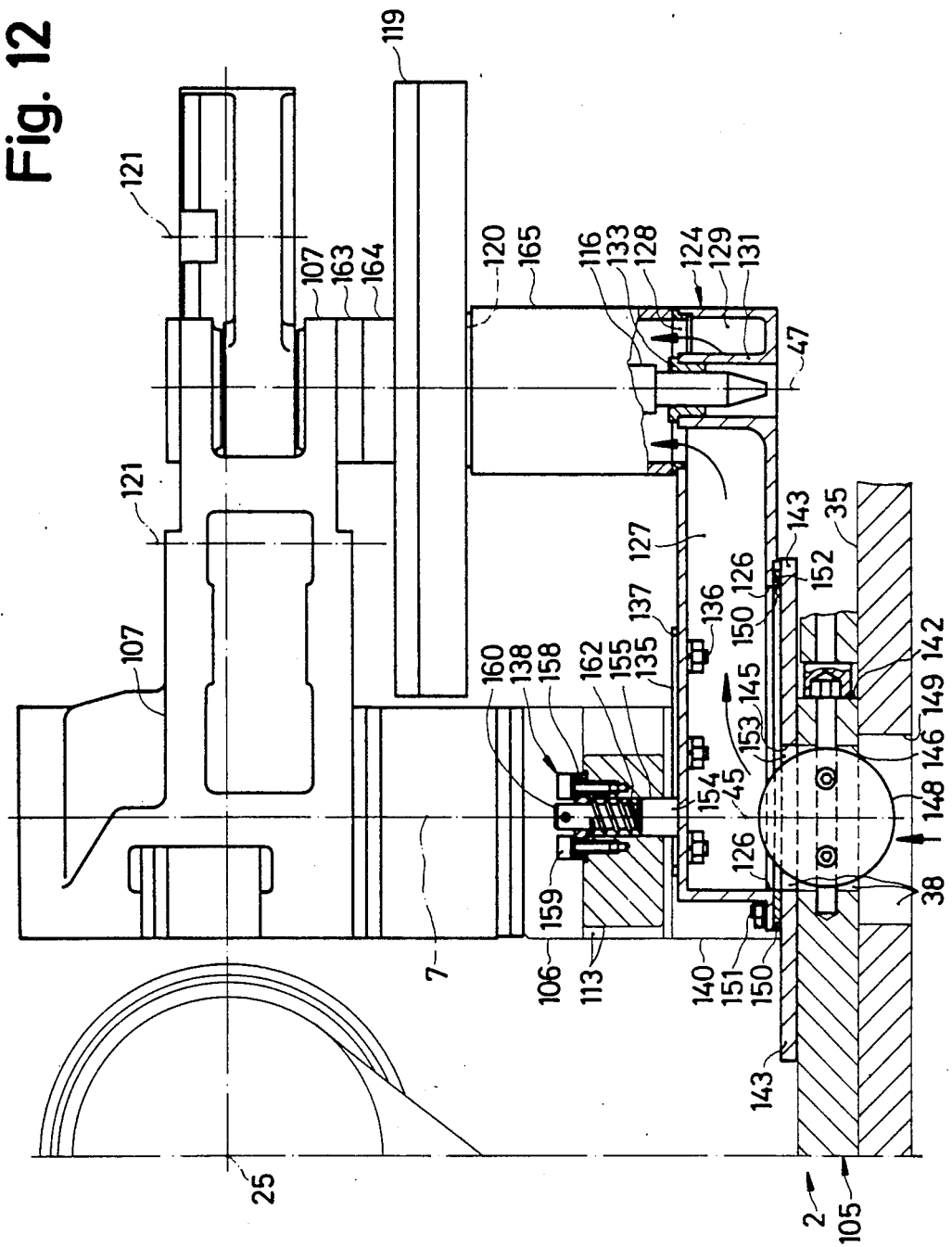

COOLING ARRANGEMENT FOR A GLASS FORMING APPARATUS

This is a continuation of application Ser. No. 599,561, filed Apr. 11, 1984 now abandoned.

BACKGROUND OF THE INVENTION

The present invention relates to a cooling arrangement for cooling by a pressure fluid, particularly air, of a forming tool of machine for forming molten glass or other thermoplastic materials.

Cooling arrangements of the above-mentioned general type are known in the art. One of such cooling arrangements is disclosed for example, in the U.S. Pat. No. 4,361,434 and is constructed so that each connecting conduit has, in addition to an articulated conduit component at least one further articulated conduit component, which are turnable relative to one another about a turning axis parallel to a first pivoting axle. In the machines of some types with this known cooling arrangement there are difficulties for example from cooled glass residues in kinematically critical regions of the movement path of the articulated conduit components. Furthermore, the known cooling arrangements cannot be used in machines with a relatively low availability of free structural height. Because of the relatively great structural height of the connecting conduit relatively high forming tools cannot be used in these machines.

SUMMARY OF THE INVENTION

Accordingly, it is an object of the present invention to provide a cooling arrangement of the above-mentioned general type which avoids the disadvantages of the prior art.

More particularly, it is an object of the present invention to provide a cooling arrangement of the above-mentioned general type, which improves the connecting conduit kinematically and reduces trouble incidents and space consumption with respect to the structural dimensions and the movement space. Also relatively high forming tools shall be usable in the machine.

In keeping with these objects and with others which will become apparent hereinafter, one feature of the present invention resides, briefly stated, in a cooling arrangement in which an articulated conduit component is displaceable relative to a supply conduit in a displacement plane which is normal to first and second pivot axles of a forming tool and the articulated conduit component.

When the cooling arrangement is designed in accordance with the present invention, the displacement movement of the articulated conduit component combined with the turning provides for kinematically advantageous and operationally safe construction. The displacement plane can be sealed with low expenses for the pressure fluid in an advantageous manner. The connecting conduit has a small structural height and weight, and requires a relatively small movement space in the machine. Because of the small structural height of the connecting conduit, a forming tool of relatively great height i.e. axial dimension can be used particularly in a finish forming station of the machine. When for other articles the forming tools of lower height are used, the height adjustment between each pressure fluid distributing device and the articulated conduit component can be performed in a simple manner by interposition of a tubular extension piece of a respective length as disclosed in the above-mentioned U.S. Pat. No. 4,361,434.

In accordance with another feature of the present invention, the articulated conduit component is displaceable on a further articualted conduit component in the displacement plane, and the further articulated conduit component is turnable about a third pivoting axle which is fixed relative to the supply conduit and extends parallel to the first and second pivoting axles. This construction provides with an operationally safe and simple possibility to turn the articulated conduit component about the third pivoting axle. The second pivoting axle and also the third pivoting axle can be arranged relative to the first pivoting axle in each case so that they provide for each type of a machine equipped with this cooling arrangement for optimal kinematic conditions for the articulated conduit component.

Still another feature of the present invention is that the further articulated conduit component is turnably supported with a bearing ring extending concentrically to the third pivoting axle in a bearing bush surrounding the outlet opening of the supply conduit, and the bearing ring surrounds a communicating conduit which connects the outlet opening of the supply conduit with the inlet opening of the articulated conduit component. This construction provides for a structurally simple and rigid turning support of the articulated conduit component about the third pivoting axle.

Yet another feature of the present invention is that an outer flange of the bearing ring is held in the bearing bush by a longitudinally split holding ring mounted on the bearing bush. This construction guarantees the turning support of the articulated conduit components.

A further feature of the present invention is that a grooved block is mounted on the further articulated conduit component at each side of the bearing ring in a plane extending through the third pivoting axle, and a guiding strip of the articulated conduit component is displaceably guided in at least one lateral groove extending parallel to the above-mentioned plane in each grooved block. With this construction the articulated conduit component is displaceably connected in a simple and operationally safe manner with the further articulated conduit component. The grooved blocks provide for a displacement guidance with a great area and in a wear free manner.

Still a further feature of the present invention is that with the use of a gaseous pressure fluid a seal is provided between the articulated conduit components and/or between the further articulated conduit component and the bearing bush wherein the seal can be formed as a gap seal or a slide seal. These seals are simple and operationally reliable, and lead particularly in the event of only relatively small blowing pressure of the pressure fluid to only insignificant fluid leakage loss. Such seals are especially operationally reliable and strong in condition of high operational temperatures of these machines.

In accordance with still a further feature of the present invention the outlet opening of the supply conduit lies in the displacement plane, and the articulated conduit component is turnable about a third pivoting axle which is fixed relative to the supply conduit and extends parallel to the first and second turning axles. This provides for a minimal structural height of the connecting conduit and is suitable particularly for the utilization in machine stations in which only a small free structural height is available.

Yet a further feature of the present invention is that the articulated conduit component is provided at its side opposite to the displacement plane with a guiding path which is arranged in a plane extending through the second and third pivoting axles and normal to these axles, and a sliding block is guided in the guiding path and supported turnably about its longitudinally axis which is coaxial with the thrird pivoting axle. These features guarantee with simple means the turning of the articulated conduit part about the third pivoting axle.

The sliding block can be movable in direction of its longitudinal axis and prestressed by a spring against the articulated conduit component. By the prestress in accordance with these features, the articulated conduit component can be pressed with a force of a selectable value against a counter surface on the machine. Thereby during the operation of the machine tilting of the articulated conduit component about a horizontal axis and underdesirably high fluid leakage loss is avoided.

An additional feature of the present invention is that with the use of a gaseous pressure fluid the articulated conduit component is sealed relative to the supply conduit by a gap seal or slide seal. These seals provide for the highly advantageous result mentioned hereinabove.

Still an additional feature of the present invention is that the third pivoting axle is coaxial with the longitudinal axis of the outlet opening of the supply conduit. This provides in a favorable manner for a constant communication of the inlet opening of the articulated conduit component with the outlet opening of the supply conduit.

Finally, the inlet opening of the articulated conduit component is formed so that it extends in direction of the displacement of the articulated conduit component. Therefore the outlet opening of the supply conduit can be retained relatively small.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 12 is a view showing a section taken along the line 12—12 in FIG. 10.

DESCRIPTION OF PREFERRED EMBODIMENTS

Figure 1:
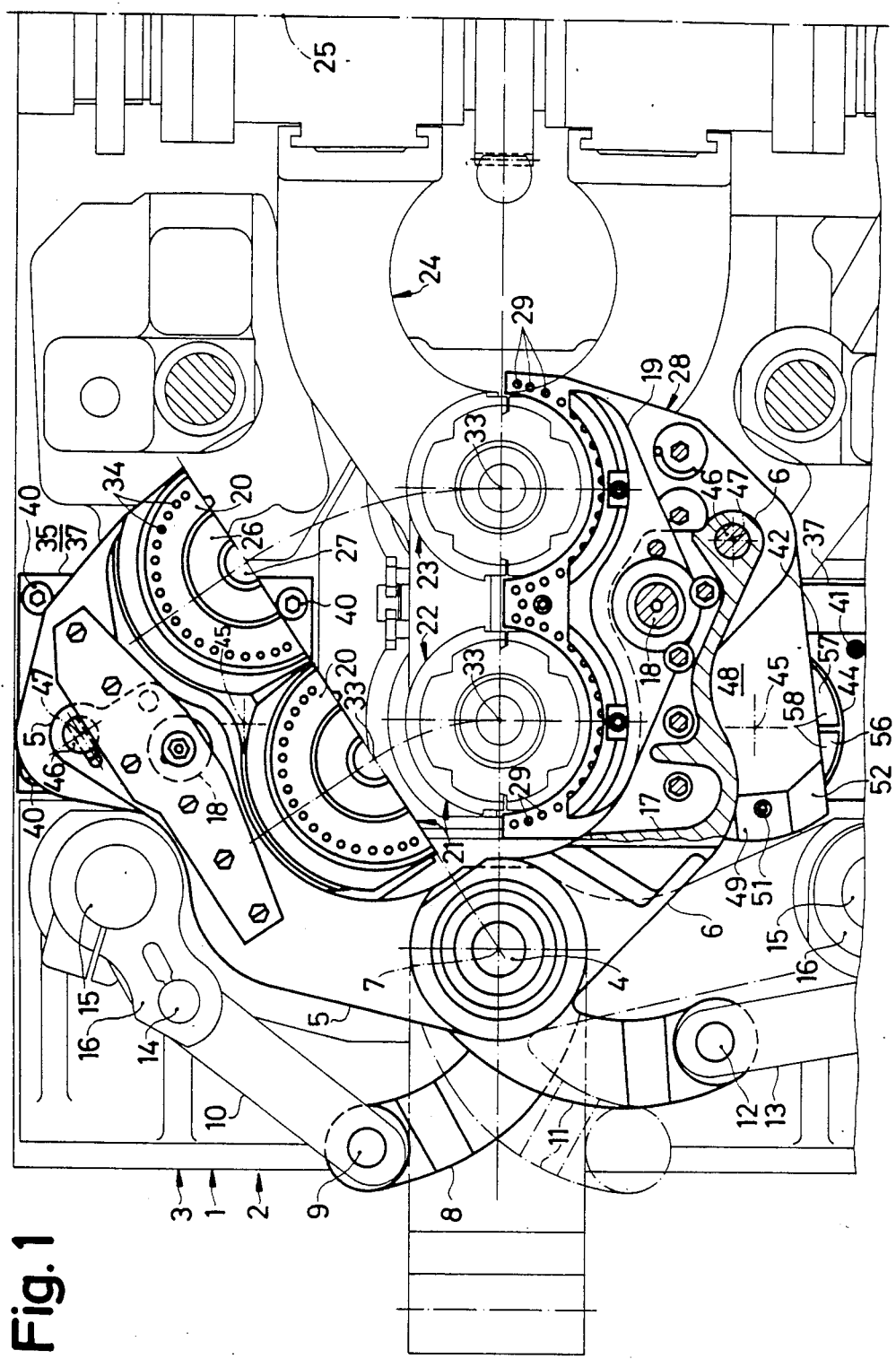
FIG. 1 is a plan view of a part of a preforming station of a section of an I.S. glass forming machine with a cooling arrangement in accordance with the present invention, partially in section.

Referring now to the drawing in detail, and first to FIG. 1 thereof, it may be seen that reference numeral 1 identifies a pre-forming station of a section 2 of a so-called I.S. glass forming machine. Glass gobs supplied from a gob feeder, which is omitted from the drawing in order not to unnecessarily encumber the same, in their molten or viscous state, are formed in the section 2 into hollow glass articles in a pressing and blowing operation.

The section 2 has a machine frame 3. An upright hinge column 4 is rigidly connected with the machine frame 3. Pre-forming tong-shaped halves 5 and 6 are pivotally mounted on the hinge column 4. The pre-forming tong-shaped half 5 is shown in FIG. 1 in its open position, whereas the preforming tong-shaped half 6 is shown in FIG. 1 in its closed position. The hinge column 4 has a first pivoting axle 7 which defines its longitudinal axis. A rearward arm 8 is mounted on the preforming tong-shaped half 6 and is connected by means of a bolt 9 with a lug 10. In a similar manner, a rearward arm 11 extends from the pre-forming tong-shaped half 5 and is connected by means of a bolt 12 with a lug 13. Each lug 10, 13 is pivotally connected with a respective crank pin 14 of a crank 16 mounted on a driving shaft 15. The driving shafts 15 are driven in a known manner for synchronously turning in opposite directions and move the pre-forming tong-shaped halves 5 and 6 in a manufacturing cycle between the end positions shown in FIG. 1.

Each of the halves 5 and 6 has a lateral recess 17, and a tilting member 19 is tiltably mounted in the recess 17 by means of a tilting bolt 18. A forming tool 21 constructed as a double mold is suspendable in each tilting member 19 and includes two pre-forming mold halves 20 arranged in the preforming tong-shaped half 5 in FIG. 1. The forming tool 21 also has two separate neck rings 22 and 23 which are tiltable in a known manner independently of the pre-forming tong-shaped halves 5 and 6 on an invert arm 24 of the section 2 about a longitudinal axis 25 of the invert arm 24. In the closed position of the pre-forming tong-shaped halves 5 and 6 the pre-forming mold halves 20 of both pre-forming tong-shaped halves 5 and 6 overlap the upper region of the closed neck rings 22 and 23 and form closed preforming molds. A glass gob is introduced through an upper opening 26 of the closed pre-forming mold halves 20 in a known manner into the closed pre-forming mold and is pre-formed by a pressing plunger 27 moving from below through the neck rings 22 and 23 into a parison.

Figure 3:
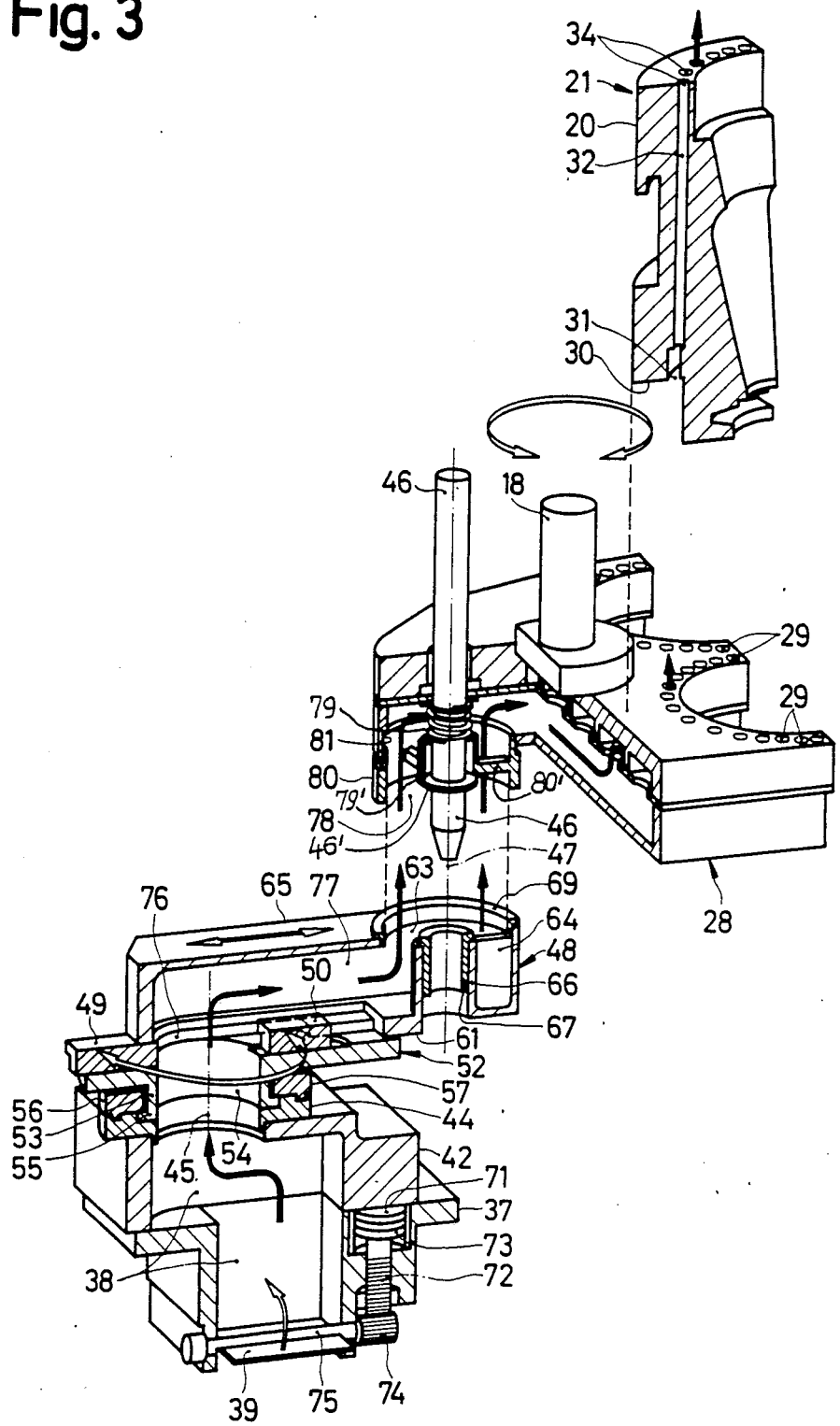
FIG. 3 is a perspective view of the cooling arrangement of FIGS. 1 and 2 shown in a section and exploded.

A pressure fluid distributing device 28 is mounted on each preforming tong-shaped half 5 and 6 and each has two semi-circular arrangements of upwardly directed outlet openings 29 for a pressure fluid which in this case is a pressure air (compare also FIG. 3). The pre-forming mold halves 20 are placed with their annular surfaces 30 on the outlet openings 29, as can be seen from FIG. 3, so that the outlet openings 29 are in alignment with inlet openings 31 of conduits 32 of the pre-forming mold halves. Each conduit 32 of the pre-forming mold half 20 lies in a plane extending through a longitudinal axis 33 of the pre-forming mold and has an upper outlet opening 34.

The machine frame 3 has a head plate 35 which limits from above a cooling air box and is provided for each pressure fluid distributing device 28 with a cutout 36. An insert 37 with a valve flap 39 arranged tiltable in a supply conduit 38 (FIG. 4) is inserted in each cutout 36 and fixed by screws 40 on the head plate 35. Each insert 37 carries a projection 42 mounted on it by screws 41 and surrounding a further part of the supply conduit 38 for the cooling air. A bearing bush 44 is inserted in an upper receiving opening 43 of the projection 42 and surrounds an upper circular part of the supply conduit 38 with a longitudinal axis which defines a third pivoting axle 45. Both third pivoting axles 45 extend parallel to the first pivoting axles 7.

A driving bolt 46 is mounted on each pressure fluid distributing device 28 with a lateral distance from the tilting pin 18. The longitudinal axis of each driving pin 46 defines a second pivoting axle 47 which extends parallel to the first pivoting axle 7 and to the third pivoting axle 45.

As can be seen from FIG. 3, each driving pin 46 extends downwardly beyond the lower limit of the pressure fluid distributing device 28 and engages with a respective articulated conduit component 48. The driving pin 46 and thereby the second pivoting axle 47 turn during the opening and closing of the pre-forming tong-shaped halves 5 and 6 over circular curves about the first pivoting axle 7. The driving pins 46 entrain in this turning movement the articulated conduit components 48, so that the articulated conduit components 48 are moved in a displacement plane which is normal to the pivoting axles 7, 45, 47.

Each articulated conduit component 48 is displaceably guided by grooved blocks 49 and 50 shown in FIG. 3 relative to the supply channel 38 in the displacement plane. The grooved blocks 49 and 50 are mounted by screws 51 shown in FIG. 4 on a further articulated conduit component 52 which is supported turnably about the third pivoting axle 45. The further articulated conduit component 52 has a downwardly extending bearing ring 53 shown in FIG. 4 and surrounding a connecting conduit 54 constantly communicating with the supply conduit 38. A lower outer flange 55 is held by annular halves 56 and 57 of a longitudinally split holding ring 58 in a complementary annular groove of the bearing bush 44 shown in FIG. 4. The arrangement is constructed so that during a turning movement of the pre-forming tong-shaped halves 5 and 6 the articulated conduit components 48 on the one hand, are turnably entrained by the driving pins 46 about the second pivoting axle 47, and on the other hand, are longitudinally guided by the grooved blocks 49 and 50 so that a longitudinal axis of each articulated conduit component 48 always intersects the associated third pivoting axle 45. The articulated conduit parts 48 perform a combined turning and displacement movement in the above-mentioned displacement plane.

Figure 2:
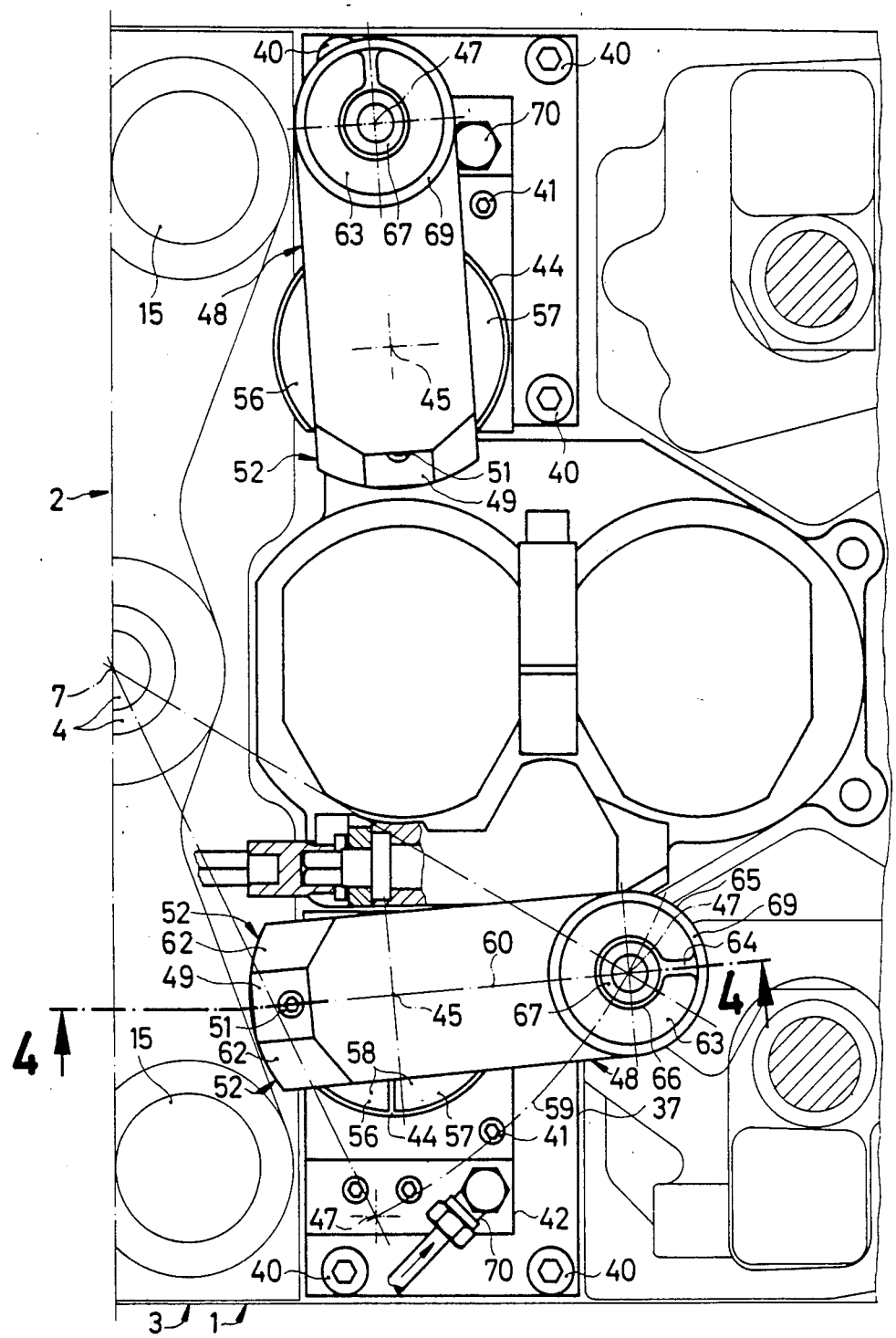
FIG. 2 is a view substantially corresponding to the plan view of FIG. 1, however, without preforming tongshaped parts and preforming molds.

FIG. 2 provides for a better showing of the articulated conduit components 48 and their movement space in the section 2. The upper half of FIG. 2 shows the articulated conduit component 48 in its turning displacing position with the fully opened pre-forming tong-shaped half 5 of FIG. 1. In contrast, the lower half of FIG. 2 shows the articulated conduit component 48 in its another turning displacing position with the closed pre-forming tong-shaped half 6 of FIG. 1. The lower half of FIG. 2 moreover shows that the second pivoting axle 47 moves between the fully closed and fully opened position of the pre-forming tong-shaped half 6 over a circular arc 59 about the first pivoting axle 7. In addition to this turning movement the articulated conduit component 48 performs between the abovementioned end portions a displacement movement in direction of its longitudinal axis 60, guided by the grooved block 49 and 50 of FIG. 4. The articulated conduit component 48 slides with its lower surface 61 on an upper surface 62 of the further articulated conduit component 52. A small gap is provided between the surfaces 61 and 62. The pressure fluid loss through this gap is neglectibly small, particularly with a relatively low blowing pressure of the pressure fluid.

Figure 4:
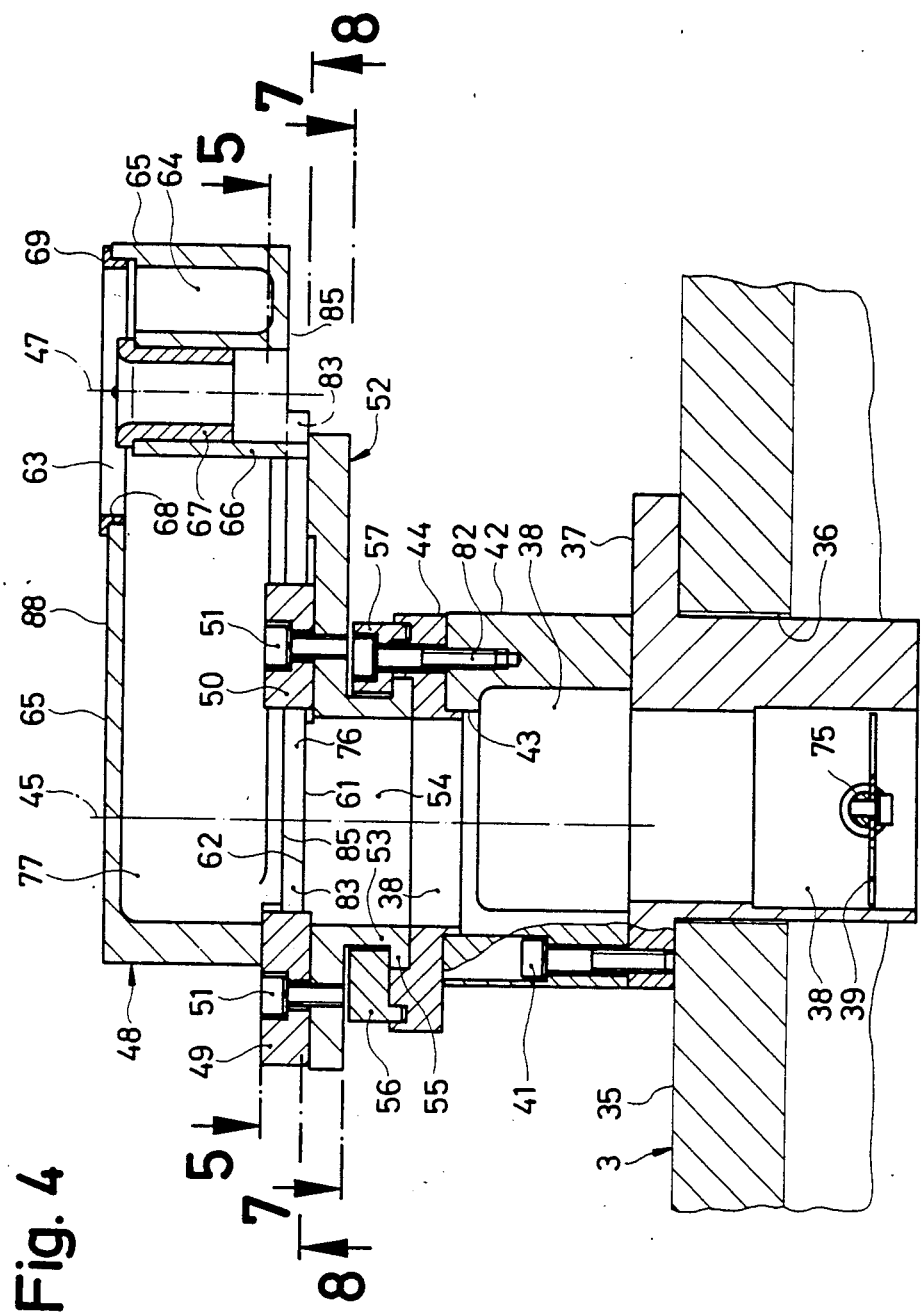
FIG. 4 is a view showing a section taken along the line 4—4 in FIG. 2.

FIG. 2 shows an outlet opening 63 of the articulated conduit component 48 of an almost completely circular ring shape. The circular ring shape is interrupted only by a radial web 64 which connects a housing wall 65 of the articulated conduit part 48 with a hollow cylinder 65 of the articulated conduit component 48, the hollow cylinder being concentric to the second pivoting axle 47. A bearing bush 67 for receiving the lower end of the driving pin 46 of FIG. 3 is inserted in the upper end of the hollow cylinder 66. The outlet opening 63 is outwardly limited by an angular ring 69 inserted in an opening 68 of the housing wall 65 as shown in FIG. 4.

FIG. 2 further shows a connecting nipple 70 for the supply of a control pressure air, arranged on the projection 42. The control pressure air is supplied via a not shown conduit system in the projection 42 to a cylinder 71 and actuates a piston 73 which is connected with a toothed rack 72. A pinion 74 provided on a shaft 75 of the valve flap 39 engages with the toothed rack 72. Thereby the valve flap 39 can be remotely controlled between a position in which it substantially closes the supply conduit 38 and a position in which it fully opens the supply conduit 38.

In FIG. 3 the flow path of the cooling air is shown with solid arrows, and movement directions are shown by contour arrows. The cooling air flows from the connecting conduit 54 through an inlet opening 76 extending in a direction of the second pivoting axle 47 in the lower surface 61 of the articulated conduit component 48 to an inner chamber 77 of the articulated conduit component 48 and from there to the outlet opening 63.

The pressure fluid distributing device 28 has a circular ring-shaped inlet opening 78 extending concentrically to the second pivoting axle 47 and receiving the cooling air from the outlet opening 63. The inlet opening 78 is limited by a tubular extension piece 80 which in assembled condition abuts with a lower ring-shaped end surface against an upper counter surface of the angular ring 69 of the articulated conduit component 48 and forms with the same a sliding seal. A pressure spring 79 presses the extension piece 80 downwardly to a tight contact with the angular ring 69. The cooling air flows from the inlet opening 78 in direction of the solid arrow through a chamber system of the pressure fluid distributing device 28 until it exits upwardly through the outlet opening 29 and reaches the conduits 32 of the pre-forming mold halves 20, of which only one is shown in FIG. 3.

The tubular extension piece 80 is axially displaceably guided with its narrowing upper part in a receiving opening 81 of the pressure fluid distributing device 28. It has webs 80' which lead radially inwardly to a cup 79'. The cup 79' abuts above against the pressure spring 79 and, as long as the articulated conduit component 48 is not mounted, abuts below against a holding collar 46' of the driving pin 40. When during exchange of the produced hollow glass objects the length of the pre-forming mold halves 20 changes, the basic structure of the cooling device from the insert 37 to the articulated conduit component 48 can be retained completely unchanged. The height adjustment to the new length of the pre-forming mold halves 20 takes place by the change of the tubular extension piece 80 with a similar extension piece corresponding to the respective length.

In FIG. 4 the ring halves 56 and 57, the bearing bush 44 and the projection 42 are tensioned by screws 82 in an axial direction relative to one another. The screw 82 shown in FIG. 4 is offset by 45°. The adjustment between the ring halves 56 and 57 on the one hand, and the bearing bush 44 is provided relative to the lower of the flanges 55 of the bearing ring 53 so that between these parts a relatively small play remains which provides a free relative turning of the bearing ring 53 about the third pivoting axle 45. This play leads to only insignificant pressure fluid leakage loss.

Figure 5:
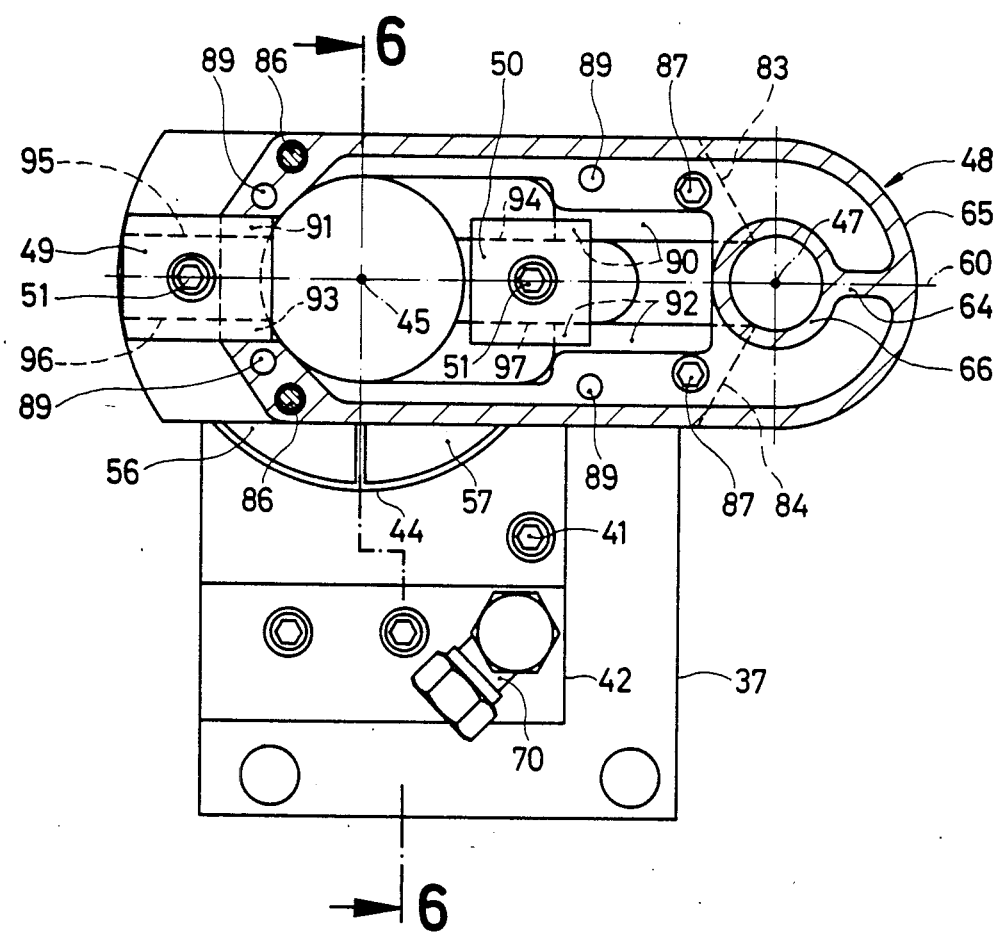
FIG. 5 is a view showing a section taken along the line 5—5 in FIG. 4.
Figure 6:
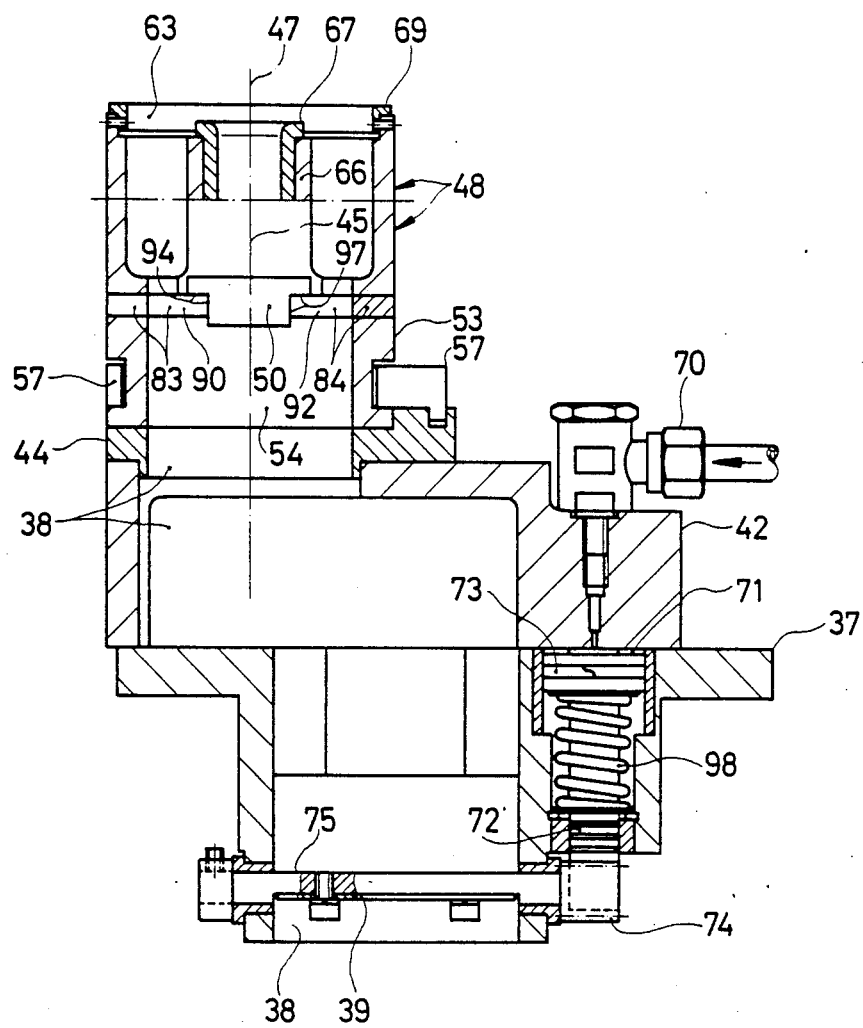
FIG. 6 is a view showing a section taken along the line 6—6 in FIG. 5.
Figure 8:
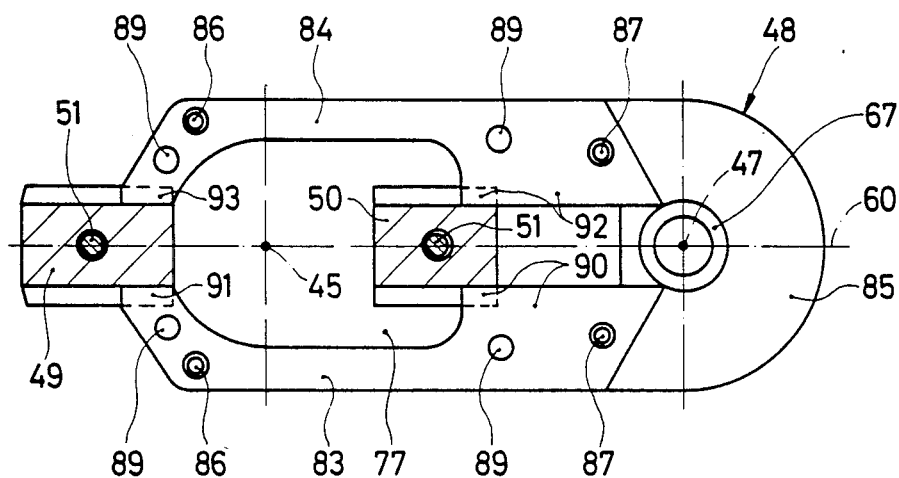
FIG. 8 is a view showing a section taken along the line 8—8 in FIG. 4.

The lower surface 61 of the articulated conduit component 48 is defined by wearing strips 83 and 84 shown in FIGS. 6 and 8 and mounted on a lower side 85 of the articulated conduit component 48 by screws 86 and 87. The screws 86 extend in a not shown manner to an upper side 88 of the articulated conduit component 48. FIG. 5 shows that each wearing strip 83, 84 is positioned by two adjusting pins 89 relative to the articulated conduit component 48.

The wearing strips 83 and 84 form in the movement region of the grooved blocks 49 and 50 guiding strips 90 and 91 as well as 92 and 93'. The guiding strips engage in lateral grooves 94–97 of the grooved blocks 49 and 50 for longitudinal guidance of the articulated conduit component 48 in direction of the longitudinal axis 60.

FIG. 6 shows a substantially T-shaped cross-sectional surface of the grooved block 50 which also has the grooved block 49. The connecting nipple 70 for supplying the control air is offset by 45°. The valve flap 39 in FIG. 6 is located in its position in which it closes the supply conduit 38 and in which the piston 73 abuts with tensioning by a pressure spring 98 in its upper end position against the lower side of the projection 42. When the control pressure air is supplied through the connecting nipple 70 to the cylinder 71, the valve flap 39 turns with increasing opening of the supply conduit 38.

Figure 7:
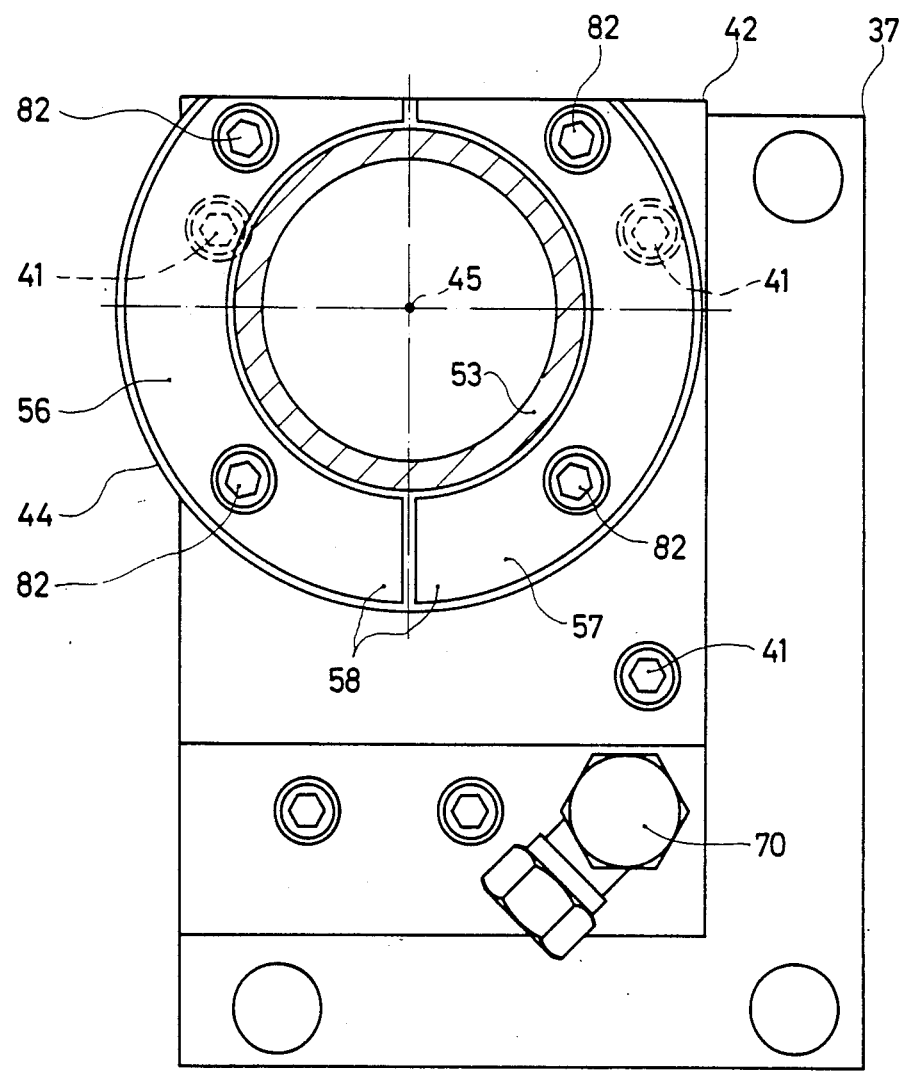
FIG. 7 is a view showing a section taken along the line 7—7 in FIG. 4.

FIG. 7 shows the exact construction of the ring halves 56 and 57 of the holding ring 58, as well as the position of the screws 41 and 82. FIG. 8 shows the exact construction of the wearing strips 83 and 84.

The cooling device in accordance with the embodiment shown in FIGS. 1-8 is used for the pre-forming station 1 of the section 2 of the I.S. glass forming machine. This embodiment however, is not limited to this application, but in the event of sufficient space condition can be used also in the finish forming station of such a section and basically also in other suitable machines for treating molten glass or other thermoplastic materials.

In the embodiment shown in the subsequent Figures the parts which are similar to the parts shown in the preceding Figures are identified with the same reference numerals.

Figure 9:
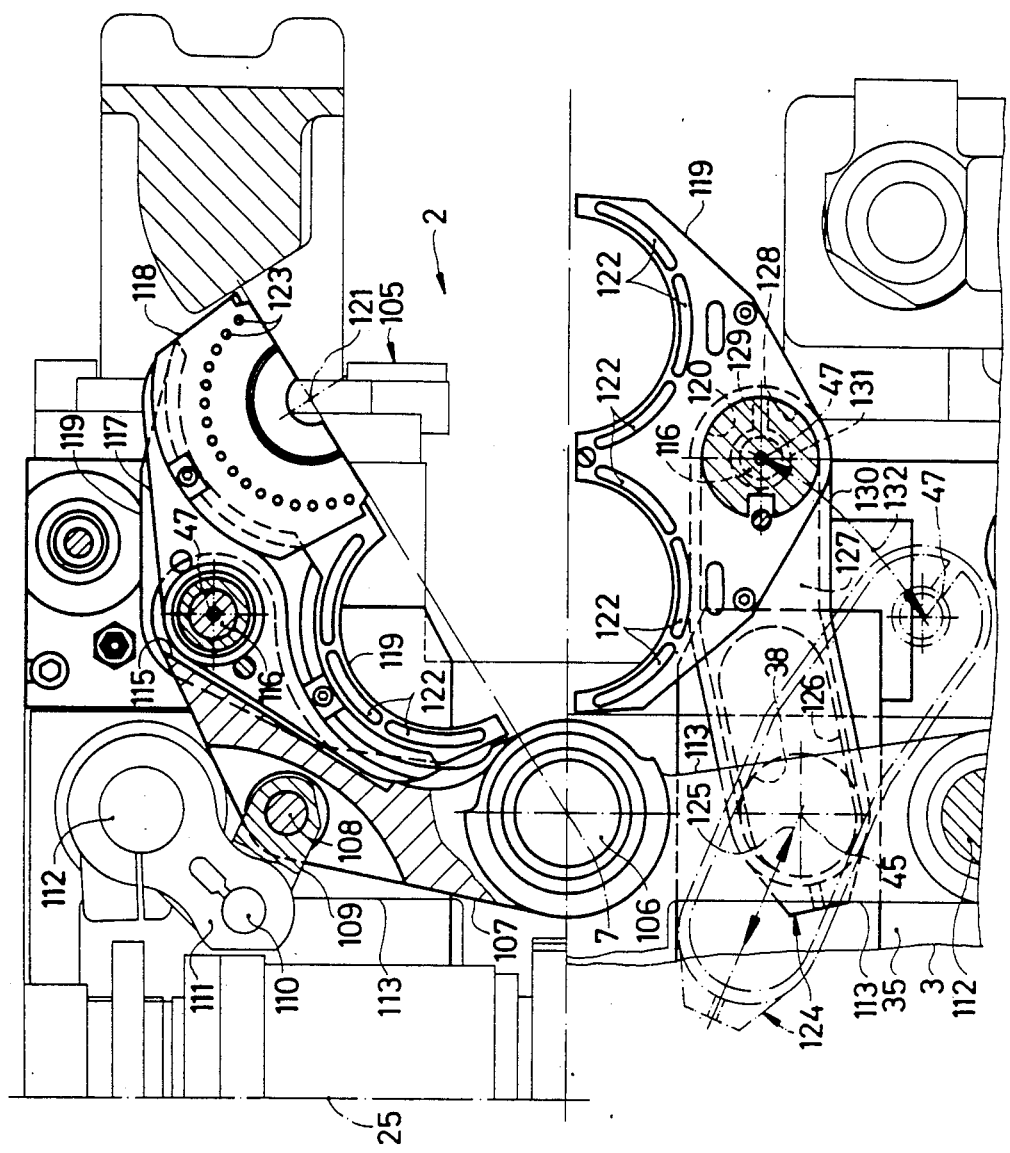
FIG. 9 is a view substantially corresponding to the plan view of FIG. 1 of a part of a finish forming station of the section of the I.S. glass forming machine of FIG. 1 with a cooling arrangement partially in section.

FIG. 9 shows a finish forming station 105 of the section 2 of the I.S. glass forming machine in accordance with the preceding Figures. Two finish forming tong-shaped halves 107 of which only the upper half is shown in FIG. 9 are turnably supported on a hinge column 106. Each finish forming tong-shaped half 107 is connected by a pin 108 with a lug 109 pivotably connected with a crank pin 110 of a crank 111. The crank 111 is turnably drivable by a driving shaft 112 supported in the machine frame 3. Both driving shafts 112 and the hinge column 106 are connected with one another by a traverse 113 which is located at a vertical distance 114 shown in FIG. 11 from the hea plate 35 of the machine frame 3.

Each finish forming tong-shaped half 107 has a lateral recess 115. A tilting bolt 116 of the tilting member 117 mounted on the finish forming tong-shaped half 107 is turnably supported in the lateral recess 115. Two finish forming mold halves 118 are suspended in each tilting member 117, of which only one finish forming half is shown in FIG. 9. The shown section 2 operates as a double-mold and produces in each working circle simultaneously two hollow glass objects.

A pressure fluid distributing device 119 is mounted on the lower side of each tilting member 117. They are constructed and operate similarly to the pressure fluid distributing device 28 of the pre-forming station 1. Each pressure fluid distributing device 119 has an inlet opening 120 for a cooling air, which is coaxial with the longitudinal axis of the tilting pin 116, the longitudinal axis being defined by the second pivoting axle 47. Starting from the inlet opening 120 the cooling air is subdivided in the interior of each pressure fluid distributing device 119 into partial streams which are finally discharged from curved slots 122 provided in the pressure fluid distributing device 119. The curved slots 122 are concentric to a longitudinal axis 121 of the respective finish forming mold half 118. The cooling air travels from the slots 122 into conduits 123 seated thereon. The conduits 123 lie in a plane extending through the longitudinal axis 121 and, as shown in FIG. 9, are open at the upper side of the finish forming mold halves 118.

The head plate 35 is provided with a bore defining a supply conduit 38 at each side of the hinge column 106 and substantially under the traverse 113. An articulated conduit component 124 is in constant communication between each supply conduit 38 and the inlet opening 120 of the associated pressure fluid distributing device 119. Thus, the cooling air can constantly travel, regardless of the turning position of the finish forming tong-shaped halves 107 from a not shown cooling air box of the machine frame 3 into the conduit 123 of the finish forming mold halves 118. FIG. 9 shows the upper part in a fully opened and the lower part in a fully closed turning position of the pressure fluid distributing device 119. In the lower half of FIG. 9 the articulated conduit component 124 is shown in solid lines for the above-mentioned closed position and in dash-dot lines for the above-mentioned opened turning position of the associated pressure fluid distributing device 119. It can be seen that the articulated conduit component 124 on the one hand performs turning about the second pivoting axle 47 and on the other hand displacement in direction of its longitudinal axis 125. This longitudinal axis always intersects the third pivoting axle 45 defined by the longitudinal axis of the supply conduit 38.

The articulated conduit component 124 has at its lower side a longitudinally extending inlet opening 126 which is in constant communication with the supply conduit 38 and has a width substantially corresponding to the diameter of the supply conduit 38. The cooling air travels from the inlet opening 126 through an inner chamber 127 of the articulated conduit component 124 to its outlet opening 128 which is coaxial with the second pivoting axle 47 and interrupted by a radial web 129 of a housing wall 130 of the articulated conduit component 124. The web 129 supports a hollow cylinder 131 of the articulated conduit component 124, the hollow cylinder being coaxial with the second pivoting axle 47.

As can also be seen from FIG. 9, the articulated conduit component 124 during its turning and displacing movement between both end positions presented below in FIG. 9, moves with the longitudinal axis of its outlet opening 128 which is identical with the second pivoting axle 47 over a circular arc 132 about the first pivoting axle 7.

Figure 10:
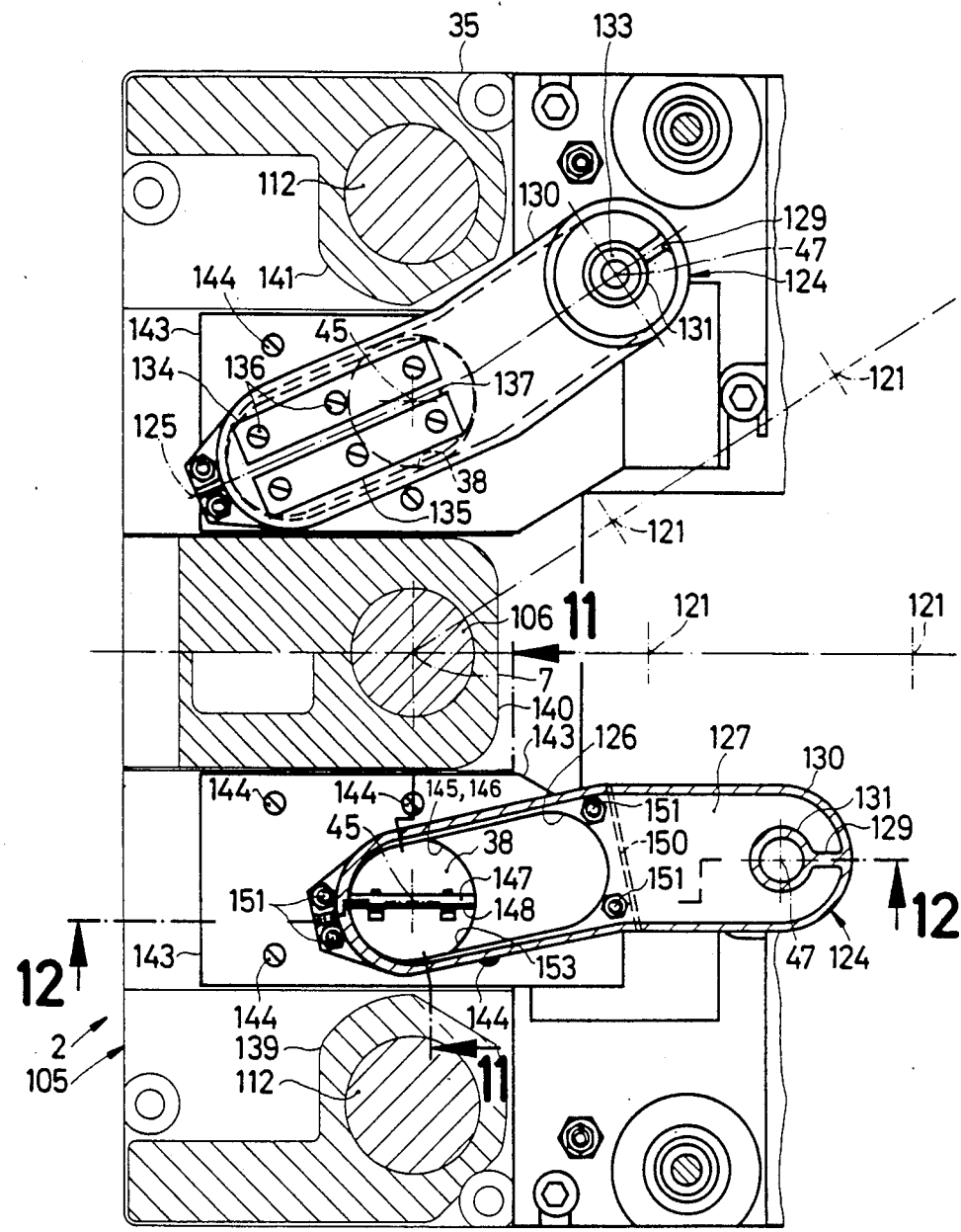
FIG. 10 is a view showing a section of the finish forming station of FIG. 9, taken along the line 10-10 in FIG. 11.
Figure 11:
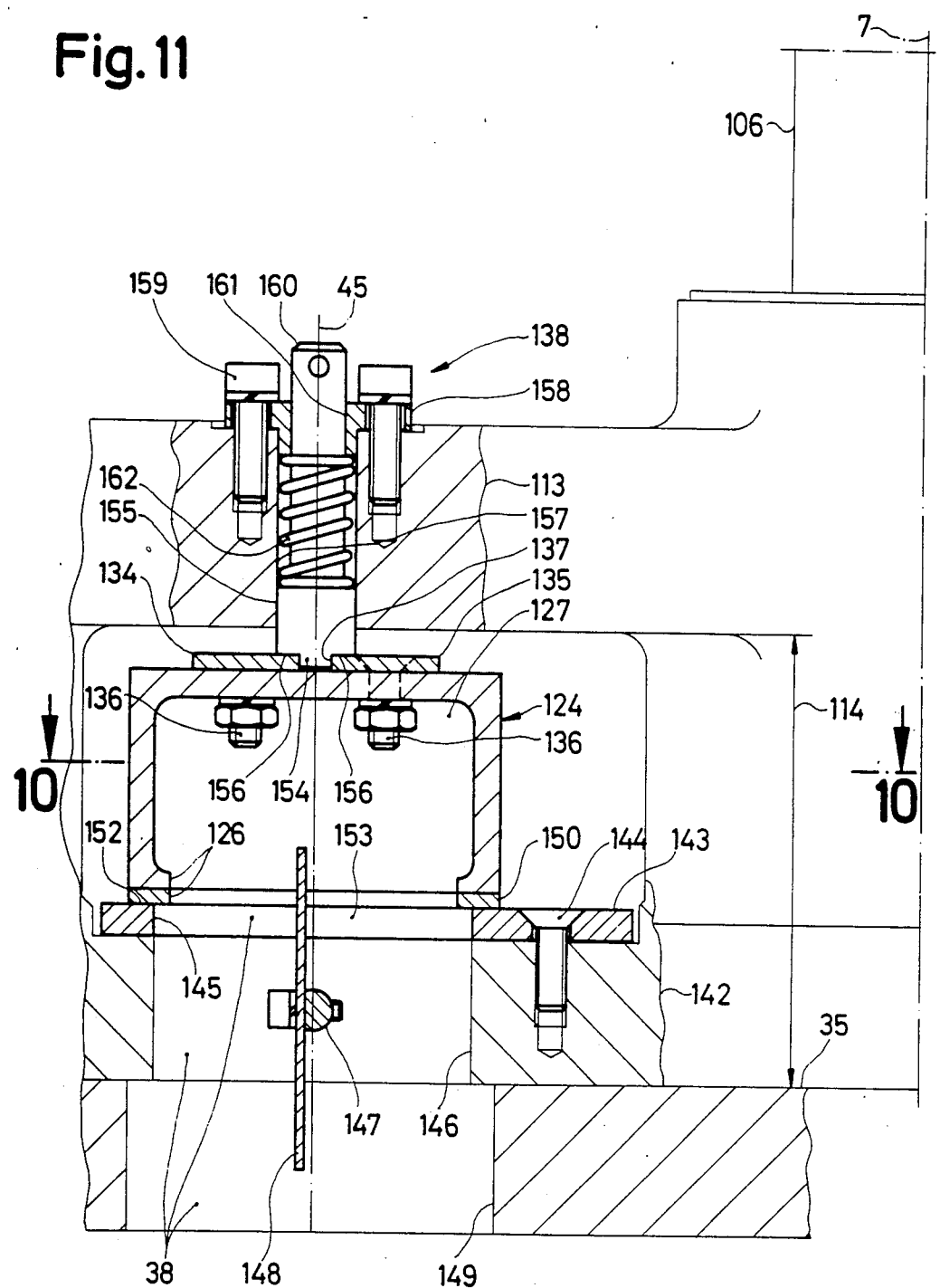
FIG. 11 is a view showing a section taken along the line 11—11 in FIG. 10.

FIG. 10 shows the upper half of the plan view of one articulated conduit component 124 and the lower half of the section along the line 10-10 in FIG. 11 through the other articulated conduit component 124. In accordance with the upper half of FIG. 10, a bearing bush 133 is inserted in each hollow cylinder 131 which is supported in accordance with FIG. 12 on a downwardly extending end of the tilting pin 116 and is turnably driven by the latter.

In accordance with FIG. 10, two guiding strips 134 and 135 are mounted by countersunk screws 136 on the upper side of each articulated conduit component 124 parallel to the longitudinal axis 125. The guiding strips 134 and 135 are located at a distance from one another which defines a guiding path 137 of a uniform width. Its longitudinal axis extends in a vertical plane through the longitudinal axis 125 and constantly intersects the third turning axle 45. This is attained by a guiding device 138 described in connection with FIGS. 11 and 12. The guiding strips 134 and 135 are composed of hardened and ground steel C-75.

The traverse 113 in FIG. 9 is mounted on columns 139, 140 and 141 shown in section in FIG. 10 and connected with one another by a common foot plate 142 as shown in FIGS. 11 and 12. The foot plate 142 is fixed on the head plate 35 of the section 2.

A sliding plate 143 for each articulated conduit part 124 is fixed by countersunk screws 144 on an upper side of the foot plate 142. The sliding plate 143 is composed of hardened and ground steel C-75 and extends in FIG. 10 (compare with FIG. 12) to the right outwardly beyond the foot plate 142. Each sliding plate 143 is provided with a bore 145 which is in alignment with a similar bore 146 in the foot plate 142. Both bores 145 and 146 are coaxial with the third pivoting axle 45 and form the upper end of the supply conduit 38 for the cooling air which flows through the cooling device in direction of the arrows in FIG. 12.

As shown in FIG. 10 and in detail in FIG. 12, a horizontal axle 147 is turnably supported in the foot plate 142 and carries a valve flap 148 substantially corresponding to the cross-sectional area of the bore 146. The actuation of the valve flap 148 can be performed, for example, in correspondence with the actuation of the valve flap 39 in the pre-forming station 1. The cooling air is supplied to the bore 146 in accordance with FIG. 12 through a cutout 149 in the head plate 35.

As can be seen from FIGS. 10 and 12, a wearing plate 150 surrounding the inlet opening 126 is mounted by countersunk screws 151 at the lower side of each articulated conduit part 124. The wearing plate 150 is composed also of hardened and ground steel C-75. A sliding seal 152 is formed between the sliding plate and the wearing plate 150. Cooling air, however, cannot escape through the sliding seal 152 since the guiding device 138 which will be described hereinbelow serves simultaneously for pressing the wearing plate 150 against the sliding plate 143 with a selectable force. The bore 145 defines an outlet opening 153 of the supply conduit 38.

FIG. 11 shows details of the guiding device 138. A guiding projection 154 of a sliding block 155 extends into the guiding path 137 from above and abuts at each side of the guiding projection 154 with a sliding surface 156 against a respective one of the guiding strips 134 and 135. The sliding block 155 which has above the guiding projection 154 a circular cross-section is displaceable in a vertical bore 157 in the traverse 113 both in direction of its longitudinal axis upwardly and downwardly, and is also supported turnable about its longitudinal axis which is coaxial with the third pivoting axle 45. A holding bush 158 is inserted in the upper end of the opening 157 and fixed by screws 159 on the traverse 113. An upwardly extending shaft 160 of the sliding block 155 extends through the holding bush 158 outwardly and is guided in a bore 161 of the holding bush 158 in a radial direction. A spring which is formed as a pressure spring surrounds the shaft 160 and is located between the sliding block 155 and the holding bush 158. The spring 162 presses on the one hand the sliding surfaces 156 against the guiding strips 134 and 135 and on the other hand the articulated conduit component 124 with its locking plate 150 against the sliding plate 143. Thereby a sufficient sealing in the region of the sliding seal 152 on the one hand and a tilting-safe guidance of the articulated conduit component 124 on the other hand, is obtained during a combined displacement and turning movements. The inlet opening 126 remains in each operational phase in communication with the outlet opening 153.

In accordance with FIG. 12, each tilting bolt 116 is elongated downwardly so that it extends trough the bearing bush 133. The tilting bolt 116 extends through a collar 163 mounted on the tilting member 117. A ring shaped intermediate piece 164 is arranged between the collar 163 and the pressure fluid distributing device 119. It is mounted together with the pressure fluid distributing device 119 on the collar 163. The intermediate piece 164 is selected in its axial length so that the pressure fluid distributing device 119 has a height required for the respective utilized finish forming mold halves 118. The distance between the pressure fluid distributing device 119 and the outlet opening 128 of the articulated conduit part 124 is overlapped by a tubular extension piece 165 of a selectable axial length. The extension piece 165 can turn both relative to the pressure fluid distributing device 119 and also relative to the articulated conduit component 124. The extension piece 165 is also displaceable in an axial direction to these two parts so that in the axial direction a tolerance compensation is provided and therefore sufficient tightness for the cooling air can be guaranteed.

It will be understood that each of the elements described above, or two or more together, may also find a useful application in other types of construction differing from the types described above.

While the invention has been illustrated and described as embodied in a cooling device for a forming tool for shaping glass or other thermoplastic materials, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A cooling arrangement of a machine for forming molten glass, wherein a forming tool of said machine is coolable by a pressure fluid and turnable about a first pivoting axle, the cooling arrangement comprising at least one stationary supply conduit having means defining an outlet opening; a pressure fluid distributing device for the forming tool turnable relative to said supply conduit about the first pivoting axle; and a connecting conduit to connect each supply conduit with said pressure fluid distributing device, said connecting conduit having an articulated conduit component turnable about a second pivoting axle which is fixed relative to said pressure fluid distributing device and is parallel to the first pivoting axle, said articulated conduit component having an inlet opening which is in a constant communication with said outlet opening of said supply conduit, said articulated conduit component, in addition to its turning about said second pivoting axle, being linearly displaceable along a longitudinal axis thereof relative to said supply conduit in a displacement plane normal to said first and second pivoting axles, and displacement means provided for allowing sliding linear displacement of said articulated conduit component along a longitudinal axis thereof, relative to said supply conduit in a displacement plane normal to said first and second pivoting axles, in addition to said turning of said articulated conduit component about said second pivoting axle.

2. A cooling arrangement as defined in claim 1; and further comprising a further articulated conduit component, said first mentioned articulated conduit component being linearly displaceable in said displacement plane on said further articulated conduit component, said further articulated conduit component being turnable about a third pivoting axle which is fixed relative to said supply conduit and parallel to said first and second pivoting axles.

3. A cooling arrangement as defined in claim 2; and further comprising a bearing ring extending concentrically to said third pivoting axle, a bearing bush surrounding said outlet opening of said supply conduit, and a communicating conduit connecting said outlet opening of said supply conduit with said inlet opening of said first-mentioned articulated conduit component, said further articulated conduit component being turnably supported with said bearing ring in said bearing bush, said bearing ring surrounding said communicating conduit.

4. A cooling arrangement as defined in claim 3; and further comprising a longitudinally split holding ring mounted on said bearing bush, said bearing ring having an outer flange supported by said holding ring in said bearing bush.

5. A cooling arrangement as defined in claim 3 wherein said displacement means comprise a grooved block mounted on said further articulated conduit component at each side of said bearing ring in a plane extending through said third pivoting axle, each of said grooved blocks having at least one lateral groove which is parallel to said plane extending through said third pivoting axle said articulated conduit component has and further comprising a guiding strip of said articulated conduit component which is linearly displaceably guided in said lateral groove of each of said grooved blocks.

6. A cooling arrangement as defined in claim 3, wherein with the use of a gaseous pressure fluid as the pressure fluid for cooling the forming tool, said articulated conduit components are sealed relative to one another; and further comprising sealing means for sealing said articulated conduit components relative to one another.

7. A cooling arrangement as defined in claim 3, wherein with the use of a gaseous pressure fluid as a pressure fluid for cooling the forming tool, said further articulated conduit component is sealed relative to said bearing bush; and further comprising sealing means for sealing said further articulated conduit component relative to said bearing bush.

8. A cooling arrangement as defined in claim 1, wherein said outlet opening of said supply conduit lies in said displacement plane, said articulated conduit component being also turnable about a third pivoting axle which is fixed relative to said supply conduit and parallel to said first and second pivoting axles.

9. A cooling arrangement as defined in claim 8, wherein said articulated conduit component has a side opposite to said displacement plane said displacement means comprising at said side a guiding path arranged in a plane extending through said second and third pivoting axles and normal to said second and third pivoting axles; and further comprising a sliding block linearly guided in said guiding path and supported turnable about its longitudinal axis which is coaxial with said third pivoting axle.

10. A cooling arrangement as defined in claim 9, wherein said sliding block is movable in direction of its longitudinal axis; and further comprising a spring arranged to stress said sliding block against said articulated conduit component.

11. A cooling arrangement as defined in claim 7, wherein with the utilization of a gaseous pressure fluid as the the pressure fluid for cooling the forming tool, said articulated conduit component is sealed relative to said supply conduit; and further comprising sealing means for sealing said articulated conduit component relative to said supply conduit.

12. A cooling arrangement as defined in claim 2, wherein said outlet opening of said supply conduit has a longitudinal axis, said third pivoting axle being coaxial with said longitudinal axis of said outlet opening.

13. A cooling arrangement as defined in claim 8, wherein said outlet opening of said supply conduit has a longitudinal axis, said third pivoting axle being coaxial with said longitudinal axis of said outlet opening.

14. A cooling arrangement as defined in claim 1, wherein said linear inlet opening of said articulated conduit component extends in direction of said displacement of said articulated conduit component.

* * * * *